United States Patent Office 3,001,986
Patented Sept. 26, 1961

3,001,986
3-OXYGENATED 17 - AMINO - 17 - CARBOXYETHYLANDROSTANE LACTAMS AND Δ⁴ COMPOUNDS CORRESPONDING
Robert R. Burtner, Skokie, and Leonard N. Nysted, Highland Park, Ill., assignors to G. D. Searle & Co., Chicago, Ill., a corporation of Delaware
No Drawing. Filed July 14, 1960, Ser. No. 42,774
12 Claims. (Cl. 260—239.5)

This invention relates to 3-oxygenated 17-amino-17-carboxyethylandrostane lactams, Δ⁴ steroids identical therewith except for the presence of the endocyclic double bond, and processes whereby these compounds are manufactured. More particularly, this invention relates to compounds of the formula

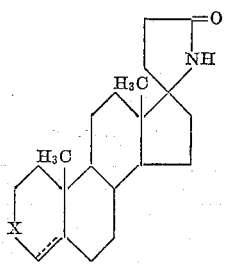

wherein X represents a carbonyl, hydroxymethylene, or alkanoyloxymethylene radical; and the dotted line indicates that a double bond between carbon atoms 4 and 5 of the steroid nucleus is optional. When this endocyclic double bond is not present, the 5-hydrogen is either α or β.

Among the alkanoyloxymethylene radicals represented by X, lower alkanoyloxymethylene radicals are preferred, which is to say radicals of the formula

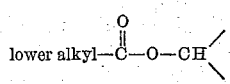

wherein the lower alkyl constituent is such as methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous groupings embracive of fewer than 9 carbon atoms.

Configuration of the hydroxy and alkanoyloxy substituents called for by X is preferably β, relative to the steroid nucleus, although α-oxy substituents are presumed likewise to serve; and as for the amino radical at 17, this also is most desirably, though not necessarily exclusively, in the β-configuration.

The compounds to which this invention relates are useful because of their valuable pharmacological properties. Thus, for example, they are characterized by anorectic activity and the capacity to reduce the heat, swelling, and rubor characteristic of the inflammatory response to tissue injury. Further, they are diuretics adapted to block the effect of desoxycorticosterone acetate on urinary sodium and potassium. Moreover, the described activity is not limited to the various products hereinbefore enformulated, but also is found in the intermediates whence these products are obtained as detailed below.

Manufacture of the claimed compounds proceeds from 3β-acetoxy-17β-amino-5(α or β)-androstane acetate, which is oxidized to the corresponding 17β-nitro compound with peracid in an inert solvent. The nitro compound, in turn, is condensed with methyl acrylate or acrylonitrile each catalyzed by a base such as tetramethylguanidine to give the 17α-(2-methoxycarbonylethyl) or 17α-(2-cyanoethyl) derivative, respectively. Either compound is hydrogenated in the presence of Raney nickel in alcoholic solvent to give the apposite (5α or 5β) 3β-acetoxy 17α-(2-carboxyethyl)-17β - aminoandrostane lactam. Cleavage of the 3-ester grouping is effected by heating with methanolic potassium carbonate, and the resulting 3-ol is oxidized to the 3-one with chromium trioxide and sulfuric acid in acetic acid medium. Alternatively, the 3-ol is re-esterified as desired with an alkanoic acid anhydride and pyridine in alkanoic acid. The 5β-3-one, upon contact with bromine in acetic acid, is converted to the 4-bromo derivative, which, when heated with lithium bromide in dimethylformamide, loses the elements of HBr to give the 4-en-3-one. The 4-en-3-one is converted to preponderantly the 4-en-3β-ol on seriatim treatment with lithium tri-tert-butoxy aluminum hydride and aqueous alkali.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

3β-acetoxy-17β-nitro-5α-androstane.—To a suspension of approximately 21 parts of 3β-acetoxy-17β-amino-5α-androstane acetate in 190 parts of 1,2-dichloroethane is added, with agitation at room temperatures during 2 hours, a solution of 25 parts of perbenzoic acid in approximately 250 parts of benzene. The resultant mixture is heated to 75° and maintained thereat with continued agitation for 1½ hours, whereupon the clear green solution which results is diluted with ether and subsequently consecutively washed with aqueous 3% sodium sulfite, aqueous 1% potassium bicarbonate, 3% hydrochloric acid, aqueous 5% potassium carbonate, and water. The solution is then dried over anhydrous sodium sulfate and stripped of solvent by vacuum distillation. Recrystallization of the crystalline green residue from a mixture of hexane and ethanol affords 3β-acetoxy-17β-nitro-5α-androstane as a colorless solid melting at 189–191°. The product has the formula

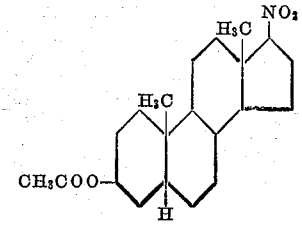

Example 2

3β - acetoxy-17α-(2-methoxycarbonylethyl)-17β-nitro-5α-androstane.—To a solution of 5 parts of 3β-acetoxy-17β-nitro-5α-androstane in a mixture of 135 parts of benzene and 50 parts of redistilled methyl acrylate is added, with agitation, 5 parts of tetramethylguanidine. Agitation is continued for half an hour after the addition is complete, following which the reaction mixture is let stand at room temperatures for 5 days. The supernatant benzene phase is then decanted from an oily residue, and the bulk of the solvent is removed therefrom by vacuum distillation. The balance of the solvent is removed by adding a small amount of water to the distilland and evaporating it in vacuo. The crystalline residue, further purified by recrystallization from a mixture of hexane and ether, affords 3β-acetoxy-17α-(2-methoxycarbonylethyl)-17β-nitro-5α-androstane, melting at 156–158°. The product has the formula

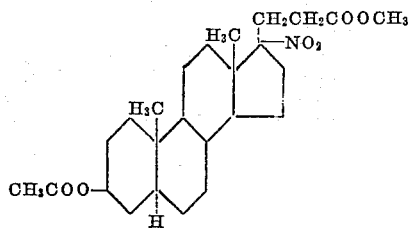

*Example 3*

*3β - acetoxy - 17α-(2-carboxyethyl)-17β-amino-5α-androstane lactam.*—A solution of 8 parts of 3β-acetoxy-17α-(2-methoxycarbonylethyl)-17β-nitro-5α-androstane in 100 parts of ethanol is mixed with 1 part of Raney nickel and maintained under 66 atmospheres of hydrogen at 100° with agitation for 5 hours. The mixture is then filtered, whereupon the filtrate is stripped of solvent by vacuum distillation. The residue, recrystallized from ethanol, affords 3β - acetoxy - 17α-(2-carboxyethyl)-17β-amino-5α-androstane lactam, melting at 305–308°. The product has the formula

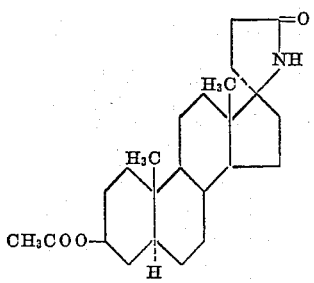

*Example 4*

*3β - acetoxy - 17α-(2-cyanoethyl)-17β-nitro-5α-androstane and 3β - acetoxy-17α-(2-carboxyethyl)-17β-amino-5α-androstane lactam.*—A mixture of 5 parts of 3β-acetoxy-17β-nitro-5α-androstane, 90 parts of benzene, 20 parts of acrylonitrile, and 5 parts of tetramethylguanidine is maintained at room temperatures for 24 hours. Approximately 10 parts of aluminum silicate is then mixed in and filtered off, whereupon the filtrate is stripped of solvent by vacuum distillation, a small amount of water being distilled from the residue to insure that the benzene present is completely removed. The crystalline residue, dried in air and recrystallized from ether, affords 3β - acetoxy - 17α - (2-cyanoethyl)-17β-nitro-5α-androstane, the melting point of which is 175–178°. The product has the formula

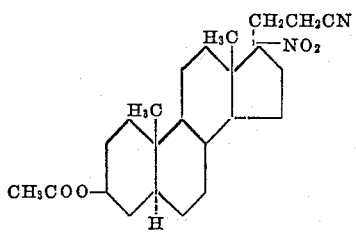

Substitution of 3 parts of 3β-acetoxy-17α-(2-cyanoethyl)-17β-nitro-5α-androstane for the 3β-acetoxy-17α-(2-methoxycarbonylethyl) - 17β - nitro-5α - androstane called for in Example 3 affords, by the procedure there detailed, 3β-acetoxy-17α-(2-carboxyethyl)-17β-amino-5α-androstane lactam.

*Example 5*

*17α-(2-carboxyethyl)-17β-amino-5α-androstan - 3β - ol lactam.*—To a solution of 4 parts of 3β-acetoxy-17α-(2-carboxyethyl)-17β-amino - 5α - androstane lactam in approximately 190 parts of methanol is added, with agitation, a solution of 6 parts of potassium carbonate in 60 parts of water. The resultant somewhat turbid solution is maintained at room temperatures with continued agitation for 24 hours. Solvent is then removed by vacuum distillation, and the residue is washed with water. Dried in air, it melts in the range 325–340°, with decomposition. This material is 17α-(2-carboxyethyl)-17β-amino-5α-androstan-3β-ol lactam, of the formula

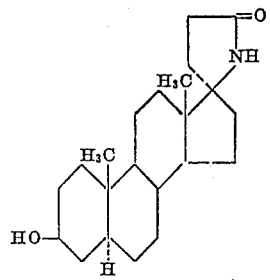

*Example 6*

*17α - (2-carboxyethyl)-17β-amino-5α-androstan-3-one lactam.*—To a solution of 20 parts of 17α-(2-carboxyethyl)-17β-amino-5α-androstan-3β-ol lactam in 500 parts of acetic acid is added, with agitation during approximately 2 minutes, a solution of 13 parts of chromium trioxide and 13 parts of concentrated sulfuric acid in 16 parts of water. Agitation is continued for 3 minutes longer, whereupon 40 parts of 2-propanol is mixed in. Volatile components are thereupon removed by vacuum distillation, and the residue is suspended in 1250 parts of aqueous 10% sodium hydroxide. The suspension is extracted with chloroform; and the chloroform extract is consecutively washed with water, dried over anhydrous sodium sulfate, and stripped of solvent by vacuum distillation. The crystalline solid residue is the desired 17α-(2-carboxyethyl)-17β-amino-5α-androstan-3-one lactam, melting at 308–312° and having the formula

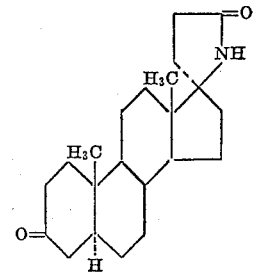

*Example 7*

*3β-acetoxy-17β-nitro-5β-androstane.*—Substitution of approximately 21 parts of 3β-acetoxy-17β-amino-5β-androstane acetate for the 3β-acetoxy-17β-amino-5α-androstane acetate called for in Example 1 affords, by the procedure there detailed, 3β-acetoxy-17β-nitro-5β-androstane, M.P. 194–196°. The product has the formula

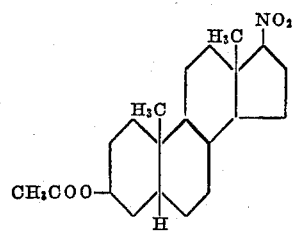

Example 8

*3β-acetoxy-17α-(2-methoxycarbonylethyl)-17β-nitro-5β-androstane.*—Substitution of 5 parts of 3β-acetoxy-17β-nitro-5β-androstane for the 3β-acetoxy-17β-nitro-5α-androstane called for in Example 2 affords, by the procedure there detailed, 3β-acetoxy-17α-(2-methoxycarbonylethyl)-17β-nitro-5β-androstane, the melting point of which is 143–145°. The product has the formula

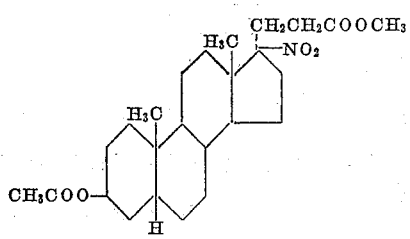

Example 9

*3β-acetoxy-17α-(2-carboxyethyl)-17β-amino-5β-androstane lactam.*—Substitution of 8 parts of 3β-acetoxy-17α-(2-methoxycarbonylethyl) - 17β - nitro-5β-androstane for the 3β-acetoxy-17α-(2-methoxycarbonylethyl)-17β-nitro-5α-androstane called for in Example 3 affords, by the procedure there detailed, 3β-acetoxy-17α-(2-carboxyethyl)-17β-amino-5β-androstane lactam, the melting point of which is 230–233°. The product has the formula

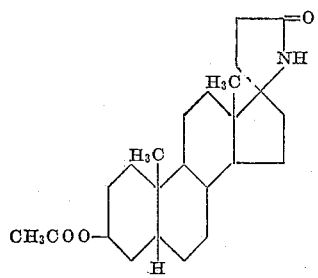

Example 10

*17α-(2-carboxyethyl)-17β-amino-5β-androstan-3β-ol lactam.*—Substitution of 4 parts of 3β-acetoxy-17α-(2-carboxyethyl)-17β-amino-5β-androstane lactam for the 3β-acetoxy-17α-(2-carboxyethyl)-17β-amino-5α-androstane lactam called for in Example 5 affords, by the procedure there detailed, 17α-(2-carboxyethyl)-17β-amino-5β-androstan-3β-ol lactam, melting at 225–230° and having the formula

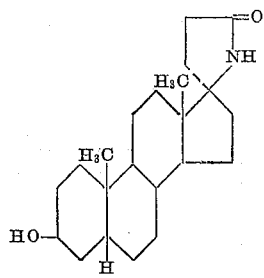

Example 11

*17α-(2-carboxyethyl)-17β-amino-5β-androstan - 3 - one lactam.*—Substitution of 43 parts of 17α-(2-carboxyethyl)-17β-amino-5β-androstan-3β-ol lactam for the 17α-(2-carboxyethyl)-17β-amino-5α-androstan - 3β - ol lactam called for in Example 6 affords, by the procedure there detailed, 17α-(2-carboxyethyl)-17β-amino-5β-androstan-3-one lactam, the melting point of which is 256–260°. The product has the formula

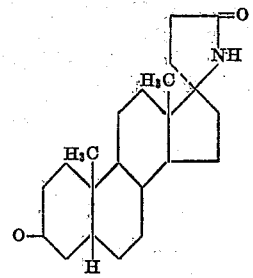

Example 12

*4β-bromo-17α - (2-carboxyethyl)-17β-amino-5β-androstan-3-one lactam.*—To a solution of approximately 9 parts of 17α-(2-carboxyethyl)-17β-amino-5β-androstan-3-one lactam in 200 parts of acetic acid is added, with agitation, a solution of 2 parts of hydrogen bromide in 25 parts of acetic acid, followed by 25 parts of water to dissolve the salt which separates. There is then incorporated, with continued agitation during 3 minutes, a solution of 5 parts of bromine in 45 parts of acetic acid. Further agitation for 15 minutes is followed by dilution with 3½ volumes of water. Upon standing in the cold, a solid precipitate of 4β - bromo - 17α - (2 - carboxyethyl) - 17β-amino-5β-androstan-3-one lactam is thrown down. Recrystallized from acetone, the product melts at 202–204°. It has the formula

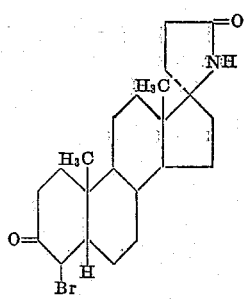

Example 13

*17α-(2-carboxyethyl)-17β-aminoandrost-4-en-3-one lactam.*—A mixture of 1 part of 4β-bromo-17α-(2-carboxyethyl)-17β-amino-5β-androstan-3-one lactam, 1 part of lithium bromide, and 30 parts of diemthylformamide is heated with agitation at 100° for 2 hours. Water is then lithium bromide, and 30 parts of dimethylformamide is filtered off, dried in air, and recrystallized from acetone. The material thus obtained is 17α-(2-carboxyethyl)-17β-aminoandrost-4-en-3-one lactam, melting at 286–290° and having the formula

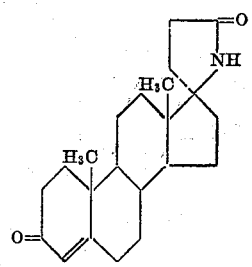

Example 14

*17α-(2-carboxyethyl)-17β-aminoandrost - 4 - en-3β-ol lactam.*—To a solution of 10 parts of lithium tri-tert-butoxy aluminum hydride in 560 parts of tetrahydrofuran is added, with agitation, 7 parts of 17α-(2-carboxyethyl)-17β-aminoandrost-4-en-3-one lactam dissolved in 560 parts of tetrahydrofuran. Agitation at room temperatures is continued for 1 hour, whereupon 8 parts of water, 20 parts of aqueous 20% sodium hydroxide, and 40 parts of diatomaceous earth is consecutively mixed in. The resultant mixture is filtered, and the filtrate is stripped of solvent by vacuum distillation. The residue thus obtained is 17α-(2-carboxyethyl)-17β-aminoandrost-4-en-3β-ol lactam, of the formula

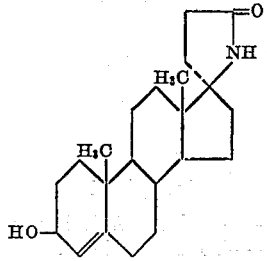

What is claimed is:
1. A compound selected from the group consisting of 5α and 5β steroids of the formula

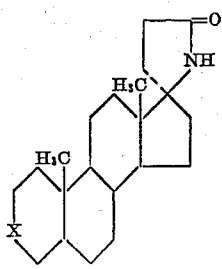

and Δ⁴ steroids otherwise identical, X in the formula being selected from the group consisting of carbonyl, β-hydroxymethylene and β-(lower alkanoyloxy)methylene radicals.

2. A compound of the formula

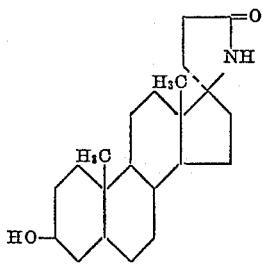

3. 17α-(2-carboxyethyl) - 17β - amino-5α-androstan-3β-ol lactam.
4. A compound of the formula

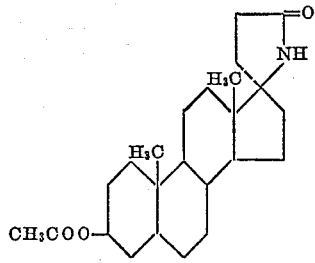

5. 3β-acetoxy-17α-(2-carboxyethyl)-17β-amino - 5α - androstane lactam.
6. A compound of the formula

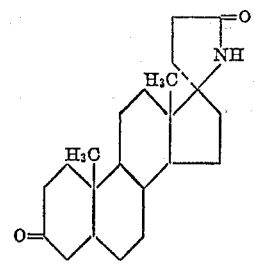

7. 17α-(2 - carboxyethyl)-17β-amino-5α - androstan-3-one lactam.
8. 17α-(2-carboxyethyl)-17β-amino - 5β - androstan-3-one lactam.
9. 17α-(2 - carboxyethyl -17β-aminoandrost-4-en-3-one lactam.
10. A compound of the formula

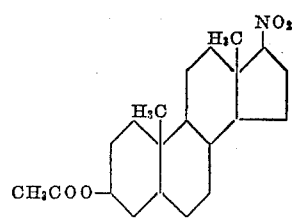

11. A compound of the formula

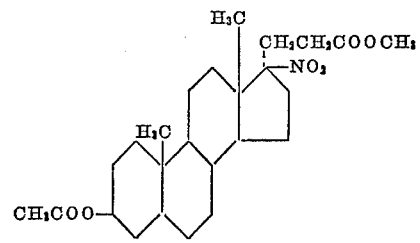

12. A compound of the formula

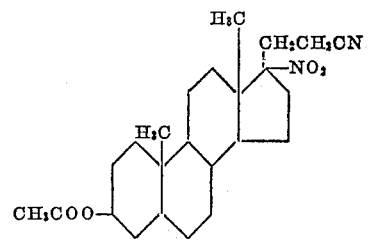

No references cited.

UNITED STATES PATENT OFFICE
CERTIFICATION OF CORRECTION

Patent No. 3,001,986                            September 26, 1961

Robert R. Burtner et al.

It is hereby certified that error appears in the above numbered patent requiring correction and that the said Letters Patent should read as corrected below.

Column 6, line 51, for "lithium bromide, and 30 parts of dimethylformamide" read -- added; and the crystalline solid which precipitates --; column 8, line 21, for "17α—(2-carboxyethyl-" read -- 17α—(2-carboxyethyl)- --.

Signed and sealed this 10th day of April 1962.

(SEAL)

Attest:

ERNEST W. SWIDER                           DAVID L. LADD  
Attesting Officer                            Commissioner of Patents